United States Patent [19]

Markle

[11] 4,045,779
[45] Aug. 30, 1977

[54] SELF-CORRECTING MEMORY CIRCUIT

[75] Inventor: Robert Eugene Markle, Rancho Palos Verdes, Calif.

[73] Assignee: Xerox Corporation, Stamford, Conn.

[21] Appl. No.: 666,825

[22] Filed: Mar. 15, 1976

[51] Int. Cl.[2] .................... G06F 11/10; G11C 29/00
[52] U.S. Cl. ............................ 364/900; 340/173 BB; 235/153 AM
[58] Field of Search ............... 340/172.5, 146.1 F, 340/173 BB; 235/153 AM

[56] References Cited
U.S. PATENT DOCUMENTS

| | | | |
|---|---|---|---|
| 3,350,690 | 10/1967 | Rice | 340/172.5 |
| 3,422,402 | 1/1969 | Sakalay | 340/172.5 |
| 3,568,153 | 3/1971 | Kurtz | 235/153 AM |
| 3,633,175 | 1/1972 | Harper | 340/172.5 |
| 3,675,200 | 7/1972 | Bossen | 340/146.1 F |
| 3,685,015 | 8/1972 | Bocek | 340/146.1 F |
| 3,753,244 | 8/1973 | Sumilas | 340/173 BB |
| 3,768,071 | 10/1973 | Knauft | 235/153 AM |

*Primary Examiner*—James D. Thomas
*Attorney, Agent, or Firm*—James J. Ralabate; Franklyn C. Weiss; Ronald L. Taylor

[57] ABSTRACT

A circuit for storing data in a random access memory containing one defective bit per word. A separate read-only memory device or programmable logic array is provided to produce an interrupt bit whenever a memory location containing a defective bit is addressed, where a defective bit is defined as one that is stuck at 1 or stuck at 0. If an interrupt bit is generated the data word is read out from memory and compared to the original. If an equality exists, nothing further is required. If there is an inequality the data word is complemented and stored, and a flag bit is set. When data is read from memory, if the flag bit is set, the data word is complemented again before being used.

5 Claims, 4 Drawing Figures

4,045,779

SELF-CORRECTING MEMORY CIRCUIT

BACKGROUND OF THE INVENTION

A. Field of the Invention

This invention relates to computer memories and, more specifically, to a circuit which allows the use of defective memory chips in a computer main memory.

B. Description of the Prior Art

In the production of solid-state memory chips for use in computer main memories, the number of defective parts manufactured far outnumbers the production of perfect parts. A yield rate of ten to twenty per cent is not uncommon in the production of large-scale integrated (LSI) chips. Of course, defective parts are typically discarded. If a method could be devised for using defective parts, costs could be reduced by a factor of two to four.

In random access memory (RAM) chips, a typical failure is that a bit in the chip will be either "struck at 1," or "stuck at 0." That means that regardless of the value of the data bit intended to be loaded into a particular bit location, the output will either always be 1 or 0.

If, in a fully assembled random access memory, there is no more than one defective bit per word, then the following process may be employed to allow the memory to store and read data without fault in spite of the defective bit.

Each time a word is written into memory, it is immediately read back and compared with the original word. If the bad bit, for example, is stuck at 1, and if the bit intended to be written into that bad position is also a 1, then when the word is read from memory and compared with the original, there will be a bit by bit equality. In this case, the fact that the memory contains one defective bit will not affect the operation of the system and no corrective action is necessary.

On the other hand, if there is an attempt to write a 0 into a bit that is stuck at 1, then the word written into memory and the word read from memory will not compare identically. In this case the data word is complemented and again written into memory in its complemented form. This time, for example, a 1 will be written into the memory bit that is stuck at 1 so that, at some later time, when the data is read from this memory word, it will be identical to the word actually stored. All that is necessary is that the word be complemented again before being used.

One bit must be added to the memory word length and is used as a flag bit to indicate whether the data in that memory word location has been complemented or not. Thus, if the word was written into memory in its complement form, a 1 will be entered in the flag position. At some time thereafter when data is read from this memory location the flag bit will also be read.

If the flag is 0, the data is used as it is received from the memory. If the flag bit is at 1, the data is complemented before being used. In all cases, therefore, the data ultimately read from the memory will be correct in spite of the fact that each memory word location may have a defective bit. In this way, defective parts may be used in a memory without impairing the accuracy of the data.

A disadvantage of this process is that every word that is written into memory must immediately be read out and compared with the original word. This reduces the speed of the system.

SUMMARY OF THE INVENTION

One method of overcoming the need to go through an extra read-compare cycle every time a word is written into memory would be to store the addresses of all words with a defective bit into a programmable read-only memory device (PROM), a read-only memory device (ROM), or a programmable logic array (PLA). Once a memory has been assembled, the addresses of words which have a defective bit (limited to one per word) would be identified and programmed into the PROM which would then be plugged or soldered into the memory circuit card.

In use, when the main memory is addressed, the PROM would simultaneously be addressed. If the memory word was not defective there would be no output from the PROM and the word would be loaded into memory in a normal fashion, without an extra read-compare cycle. On the other hand, if the word were defective, the PROM would output an interrupt bit causing the system to go through the extra read-compare cycle. Thus, to use a numerical example, if 400 defective words existed in the 4K memory, the extra read-compare cycle would only be used in ten per cent of the cases, resulting in a significant increase in system speed.

The hardware required to implement this system may be minimized by using PLA's instead of ROM's. Thus, in a 4K memory where less than 96 words are defective, eight PROM's, each containing 512 locations would be needed, but one PLA would be sufficient.

The object of this invention is to provide a circuit for allowing the use of defective parts in a computer memory with no loss of data bits and a minimum loss of operational speed.

DETAILED DESCRIPTION OF THE PREFERRED EMBODIMENT

Figure 1:
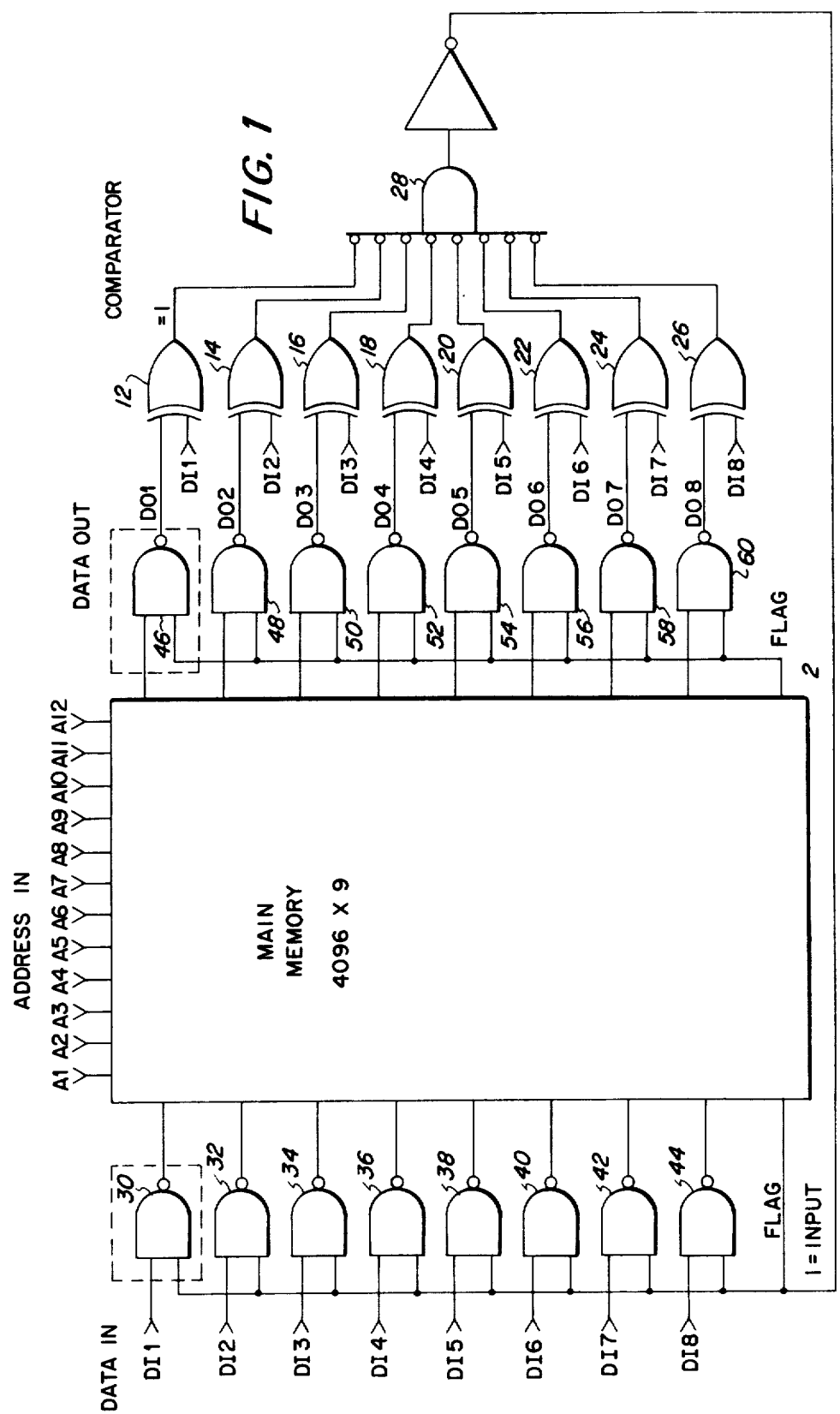
FIG. 1 is a simplified schematic of a memory containing 4,096 words, each word containing eight data bits and one flag bit, and a comparator circuit for determining whether the output data is identical to the input data.

The Main Memory 2 of FIG. 1 is implemented to contain 4,096 words, each nine bits wide, where eight of these bits are data bits and one bit is a flag bit. The data inputs are labeled DI1 through DI8, the address inputs are labeled A1 through A12 and the data outputs are labeled DO1 through DO8. An additional flag bit per word is provided. Data is loaded into this Main Memory in the ordinary manner; that is, address information is applied through address inputs A1 through A12; data is applied at data inputs AI1 through DI8 and, upon the application of suitable clocks and enable signals, not shown, the data is clocked into the appropriate address. Likewise, from this Main Memory 2, upon the input of a suitable address, clock and enable signals, data may be clocked out through outputs DO1 through DO8. For the purposes of this invention, the Main Memory may be implemented from ferrite cores, solid-state devices, or any other device capable of storing data bits.

Figure 3:
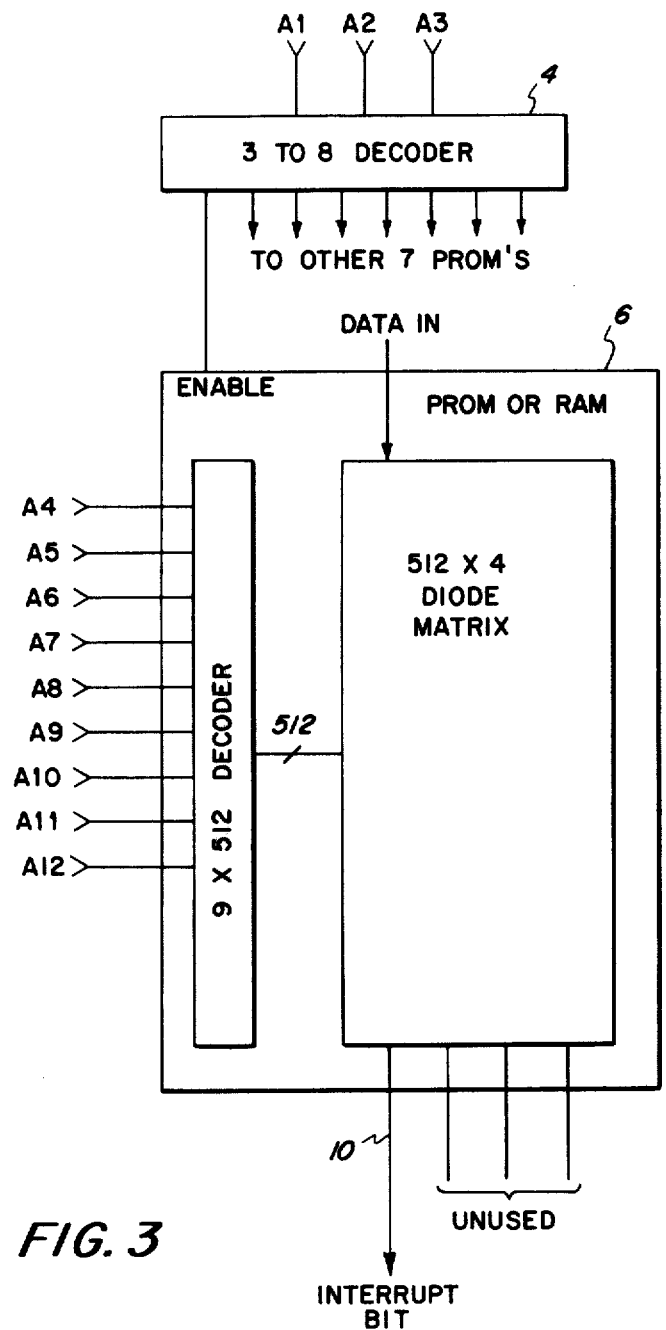
FIG. 3 is a circuit for generating an interrupt using a PROM device.

Simultaneously, with the application of address and data inputs to the Main Memory 2, the address information is also applied to the circuit shown in FIG. 3. Assuming a PROM of 512 words by four bits, a one-to-one correspondence between Main Memory words and PROM words may be obtained through the use of eight PROMS each containing 512 words. The proper one of eight PROMS may be selected by decoding the three most significant address lines, the output of said decoder 4 enabling the appropriate PROM 6. The nine least significant address lines drive the PROM 6 directly to access that word in PROM memory corresponding to the addressed word in Main Memory 2. The PROM has been programmed so that if the address corresponds to a defective Main Memory word, then there will be an interrupt output from the PROM.

A 512 × 4-bit PROM, which is a common commercial configuration, is shown in FIG. 3. In this case, since only one interrupt output bit is required the other three outputs are unused. If a 2K × 1-bit PORM were available commercially, then two PROMS would be sufficient for the 4K memory shown in FIG. 1.

Figure 4:
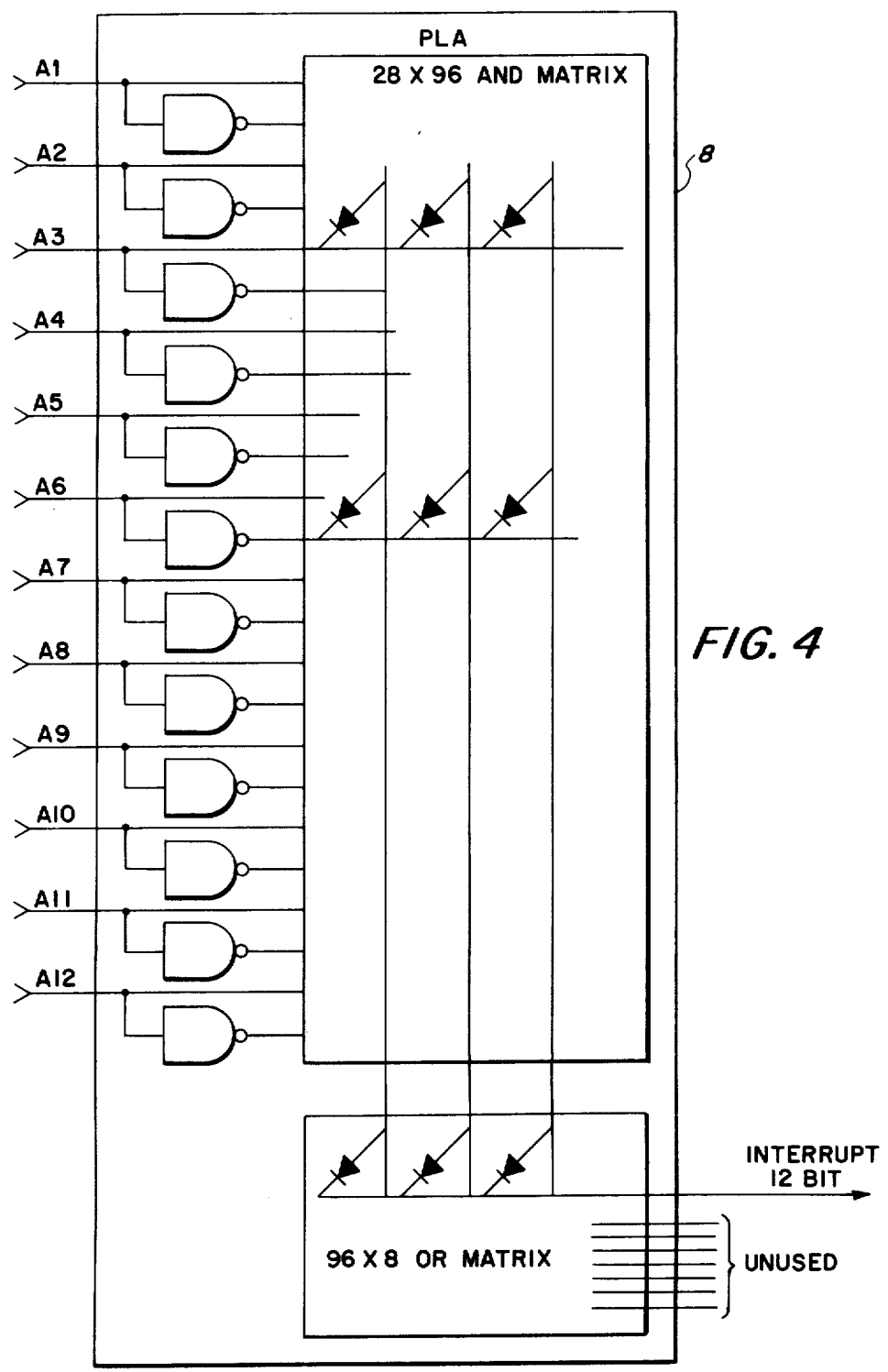
FIG. 4 is a circuit for generating an interrupt using a PLA device.

An alternate circuit for generating the read-compare interrupt is shown in FIG. 4, implemented from a PLA of the type manufactured by National Semiconductors and specified as Part No. DM7575. The device can accept up to 14 input address lines but in this circuit application only 12 are required. These addresses (also called variables) and their complements are applied to a 28 × 96 bit diode matrix. Two rows and three columns of this matrix are shown as an example. The diodes are selectively opened during the mask-programming process so that an output will be produced for addresses corresponding to defective locations. The diodes in this 28 × 96bit matrix may be referred to as the AND matrix.

The 96 columns, of which three are shown, are connected into a 96 × 8 bit matrix, the OR matrix. This matrix is also mask-programmable so that the system designer has the option of having any column coupled through as an Interrupt Output. For use in this particular circuit only one interrupt output is required and therefore the other seven outputs will be unused.

The PLA is programmed to produce an Interrupt Output whenever the input address lines specify a Main Memory location containing a defective bit.

Figure 2:
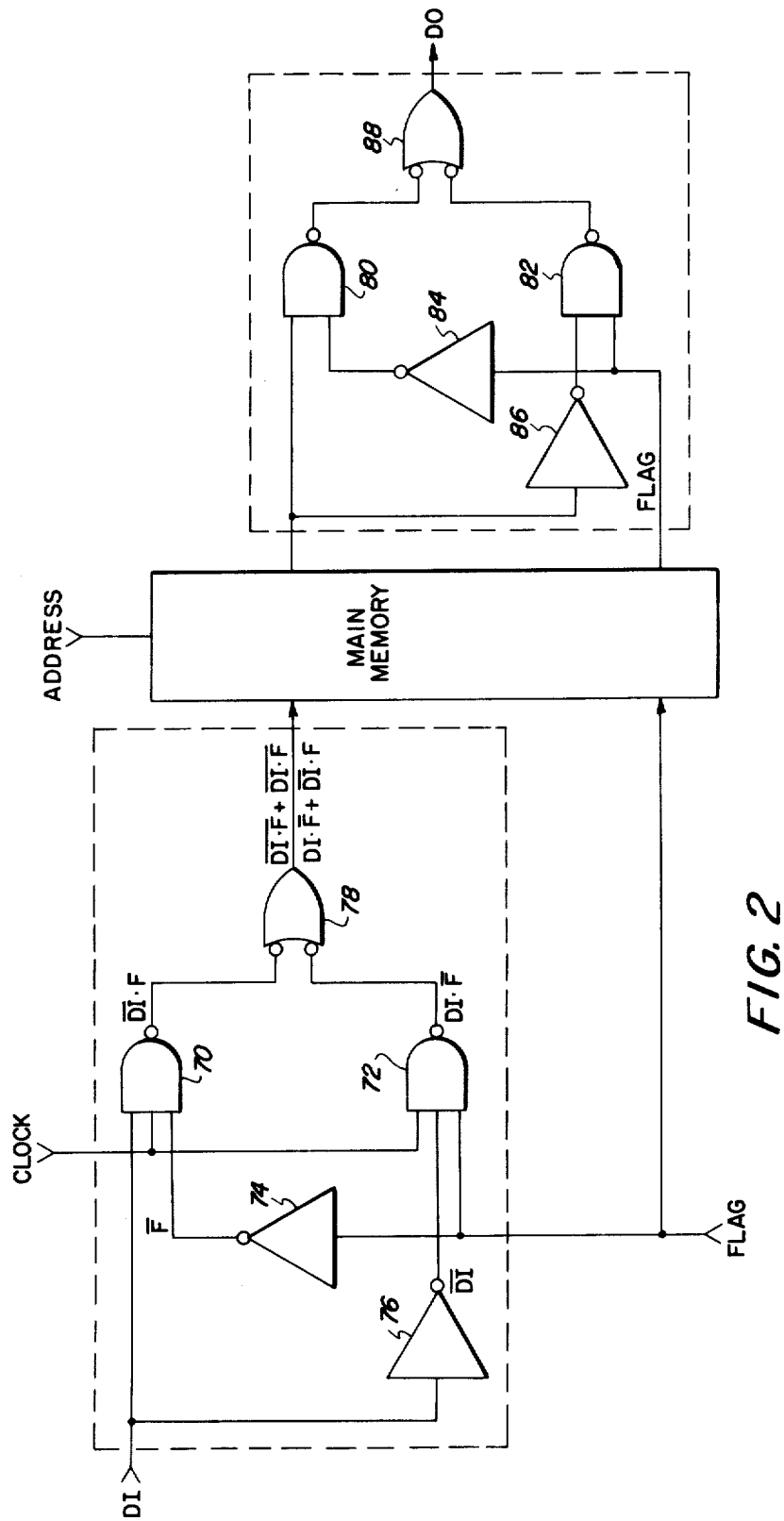
FIG. 2 is a more detailed schematic of one Main Memory data input and output line.

The areas inside the dotted lines of FIG. 2 show in greater detail the two circuits inside the dotted lines of FIG. 1, designated as gates 30 and 46. The data input is applied directly to gate 70 or inverted by inverter 76 and applied to gate 72. Likewise, the flag is applied directly to gate 72 or inverted by inverter 74 and applied to gate 70. Both gate 70 and 72 outputs are applied to the exclusive NOR gate 78 resulting in the output shown. The logic equation above the line is equivalent to that below it.

Each output data bit is processed by a similar circuit comprising gates 80 and 82, inverters 84 and 86, and an XNOR 88. Here again the output data is inverted if the flag is true.

The operation of the system is as follows: When a data word is to be read into Main Memory 2 of FIG. 1, the data will be presented at the eight data input lines DI1 through DI8 and simultaneously the twelve address inputs will be presented at address input lines A1 through A12. With appropriate clocking and enabling signals the data will be clocked into the specified Main Memory location. Simultaneously, with this load operation, the identical addressing information will be presented to either the PROM 6 of FIG. 3 or the PLA 8 of FIG. 4. If the PROM is used the three most significant bits will be used to select one of eight PROMS while the nine least significant bits will be used to select a row in that PROM's diode matrix. If the address corresponds to a location in Main Memory with a defective bit, a PROM output will be developed at the interrupt output line 10.

If a PLA is used all 12 address lines are applied directly to the PLA shown in FIG. 4; the address lines are all complemented and the resultant twenty-four inputs are applied to the 28 × 96 bit AND Matrix. If the address corresponds to an address in Main Memory containing a defective bit, the AND and OR matrixes are programmed to result in an Interrupt at line 12.

If the address corresponds to the location in Main Memory that was not defective, no Interrupt will be generated and the load memory operation is completed. However, if the main memory location contained a defective bit either the PROM or PLA will have been programmed to produce an interrupt which would initiate a subroutine within the computer to read out the data from Main Memory and compare it with the input data. A comparator as shown in FIG. 1 comprises eight exclusive OR gates 12 through 26 which compare each input bit with its corresponding output bit and an eight input AND gate 28 to determine whether an inequality has been detected by any one of the eight exclusive OR gates. If there is equality the comparator will produce an output 0 bit and if there is an inequality, the comparator will produce an output 1 bit. This bit is applied to the flag bit input of Main Memory 2 and also to a series of gates 30 through 44 at the data input of the Main Memory.

Finally, the load operation is performed once again. This time if there had been an equality between the input and output data originally, the flag bit would be a 0 and the input data would be loaded directly into Main Memory. On the other hand, if an inequality had existed at any exclusive OR gate, a 1 bit would be produced by the comparator gate 28 resulting in a flag bit being loaded into Main Memory and a control signal being fed to all of the input data gates 30 through 44 resulting in the complementing before loading of every input data bit. This second loading of Main Memory completes the entire load memory cycle.

When the data word is subsequently read from Main Memory, the output will automatically appear at the output lines D1 through D8 in its proper form, either normal or complemented. This is because the flag bit will have been set to 1 in case the data has been inverted and will be set to 0 in case the data has not been inverted. Therefore, the application of this flag bit to the data output gates 46 through 60 will result in an automatic complementing, if necessary, of the Main Memory output data and in all cases the correct data will appear at output lines DO1 through DO8.

An alternate use of this invention would be to use a RAM instead of a PROM in FIG. 3. When the system is first turned on, the RAM could be programmed to operate in an identical manner as the PROM described above.

Thereafter, a periodic diagnostic test of main memory could be run. If an additional defective main memory cell were discovered, an appropriate bit could be entered in the RAM through the regular data input line, thus adding the newly discovered defective bit location to the list of defective bit locations already contained in the RAM. In this way, the circuit can not only correct for bits that were originally defective, but also can correct for bits that became defective after the computer was assembled, and for bits that become defective during operation.

The preferred embodiment has been described in terms of solid-state LSI memory elements but a random access main memory implemented from cores or any other kind of memory elements may also be used in conjunction with this circuit. Likewise, interrupts are generated from address inputs by means of PROM, RAM, or PLA devices but other circuit elements used to generate one-bit outputs corresponding to selected address inputs are equally usable.

While the instant invention has been described as a particular circuit, it is not intended that the instant invention be so limited but that it be broadly covered within the scope of the appended claims.

What is claimed is:

1. An improved circuit for loading into and for reading an addressed word having data from a memory having random access upon receipt of a command from a computer having a subroutine therefore, the memory having a defective bit per word wherein the improvement comprises:
    a. interrupt means operative to receive the same address of the word to be loaded into the memory for recognition of a predetermined subset of stored addresses of bit defective words therein, and for generation of an error bit upon recognition of an address for transmittal to the computer for generating the command thereto to read out the words just loaded therein;
    b. exclusive OR gate means operative to concurrently receive each of the bits of the given word read out from the memory and the word loaded therein at the same address for generating a respective signal upon receipt of unlike bits thereat for any given bit in the word indicating a defective bit therein that is the negation of the bit to be stored therein;
    c. first gating means operative to have inputed thereto any signals generated by said exclusive OR gate means for generating a flag bit upon the receipt thereof indicating a logical complementing required of the word to be stored;
    d. second gating means operative to have inputed thereto the word to be stored for outputting a signal that is a complemented representation thereof if the flag bit from said first gating means is received concurrently for storage in the memory of the word including the flag bit when present; and
    e. third gating means operative to have inputed thereto the word read from the memory for outputing a complemented representation thereof when the flag bit included in the word by said second gating means is concurrently present.

2. The apparatus of claim 1 wherein said interrupt means comprises a read-only memory means.

3. The apparatus of claim 1 wherein said interrupt means comprises:
    a plurality $n$ of read-only memory devices, each coupled to the least significant $m$ address lines for generating an interrupt bit if a defective location in the corresponding $1/n$ th of said Main Memory is addressed,
    and an $m$ to $2^m$ decoding means coupled to the most significant $m$ address lines for selecting the one of $n$ read-only memory devices corresponding to the addressed location,
    where the number of Main Memory address lines is equal to $m + n$, 4. The apparatus of claim 1 wherein said interrupt means comprises a programmable logic array.

5. The apparatus of claim 1 wherein said interrupt means comprises a random access memory.

* * * * *